United States Patent
Shanks

(10) Patent No.: US 10,038,609 B2
(45) Date of Patent: Jul. 31, 2018

(54) NETWORK TRAFFIC ANALYSIS

(71) Applicant: Cisco Technology, Inc., San Jose, CA (US)

(72) Inventor: Robert Tristan Shanks, San Mateo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 269 days.

(21) Appl. No.: 14/744,465

(22) Filed: Jun. 19, 2015

(65) Prior Publication Data

US 2016/0373325 A1 Dec. 22, 2016

(51) Int. Cl.
*H04L 12/26* (2006.01)

(52) U.S. Cl.
CPC .......... *H04L 43/062* (2013.01); *H04L 43/028* (2013.01); *H04L 43/04* (2013.01)

(58) Field of Classification Search
CPC ... H04L 43/062; H04L 43/0876; H04L 65/80; H04L 43/028; H04L 43/04; H04L 63/1425; H04L 43/022; H04L 63/1416; H04L 45/00; H04L 45/586; H04L 45/30
USPC ............... 370/230, 235, 241, 252, 255, 338; 709/217, 223, 224, 247
See application file for complete search history.

(56) References Cited

U.S. PATENT DOCUMENTS

| | | | |
|---|---|---|---|
| 8,724,487 B1* | 5/2014 | Aitken | H04L 43/04 370/252 |
| 8,730,819 B2* | 5/2014 | Liu | H04L 43/12 370/241 |
| 2003/0135525 A1* | 7/2003 | Huntington | H04L 41/22 715/202 |
| 2011/0125748 A1* | 5/2011 | Wood | G06F 17/30964 707/737 |
| 2012/0005329 A1* | 1/2012 | Cormode | H04L 43/022 709/224 |
| 2012/0124200 A1* | 5/2012 | Ramadass | H04L 63/1408 709/224 |
| 2013/0091123 A1* | 4/2013 | Chen | G06F 17/30516 707/722 |
| 2014/0029452 A1* | 1/2014 | Banerjee | H04L 43/024 370/252 |
| 2014/0078903 A1* | 3/2014 | Edsall | H04L 47/30 370/235 |
| 2014/0086069 A1* | 3/2014 | Frey | H04L 43/026 370/252 |
| 2014/0286159 A1 | 9/2014 | Etemad et al. | |

(Continued)

*Primary Examiner* — Walli Butt
(74) *Attorney, Agent, or Firm* — Ronald S. Fernando

(57) ABSTRACT

In one embodiment, a method includes receiving, at a network endpoint device, a traffic analysis query from a network controller, the traffic analysis query including one or more query parameters, where the one or more query parameters are provided to select portions of traffic analysis data. The method also includes identifying a portion of traffic analysis data stored in a buffer that satisfies the one or more query parameters, where the traffic analysis data characterizes traffic data that has traversed the endpoint device, and where the endpoint device provides network access to one or more client devices. The method further includes providing the identified portion of the traffic analysis data to the network controller in response to the traffic analysis query.

20 Claims, 7 Drawing Sheets

(56) References Cited

U.S. PATENT DOCUMENTS

2015/0081890 A1* 3/2015 Richards ................. H04L 47/10
709/224
2015/0172143 A1* 6/2015 Degioanni .......... H04L 67/1097
370/252

* cited by examiner

NETWORK TRAFFIC ANALYSIS

TECHNICAL FIELD

The present disclosure generally relates to network traffic analysis, and in particular, to facilitating real-time reporting of network traffic analysis.

BACKGROUND

The ongoing development of data networks often involves enabling greater connectivity by expanding the area covered by a network and/or improving the robustness of accessible coverage within a particular area. Network endpoint devices, such as wireless access points (APs), simplify the deployment network infrastructure equipment and enable rapid installation and/or expansion of a network within a coverage area. Each endpoint device in a network provides network access to a number of client devices.

Previously available network monitoring and management systems fail to provide real-time reporting of network traffic analysis because previously known methods use excessive amounts of network bandwidth and a large allocation of storage provided by the network operator. For example, using previously known methods each endpoint device reports traffic data that it has processed (e.g., routed or switched) to a network controller on a periodic basis (e.g., every 60 minutes). The bandwidth used to report traffic data to the network controller in this manner could otherwise be used for normal network traffic. So, in order to limit the bandwidth used, previously known methods limited the reports to highly simplified traffic data. For example, the traffic data that is reported using known methods has a large time granularity in order to limit the actual amount of data and, thus, information reported. As a result, the traffic data cannot be provided in real-time (or near real-time) and includes only a small subset of the information that can be collected by a network endpoint device. Moreover, even though the amount of information provided by a network endpoint device is limited to conserve bandwidth, a network controller typically maintains a large database to store the reported traffic data, which becomes unwieldy as the number of endpoint devices increases. Additionally, the network controller also typically takes a significant amount of time to aggregate and analyze traffic data reported for a respective time period. Thus, statistics generated based on the traffic data stored in the database do not provide a real-time (or near real-time) characterization of network traffic.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
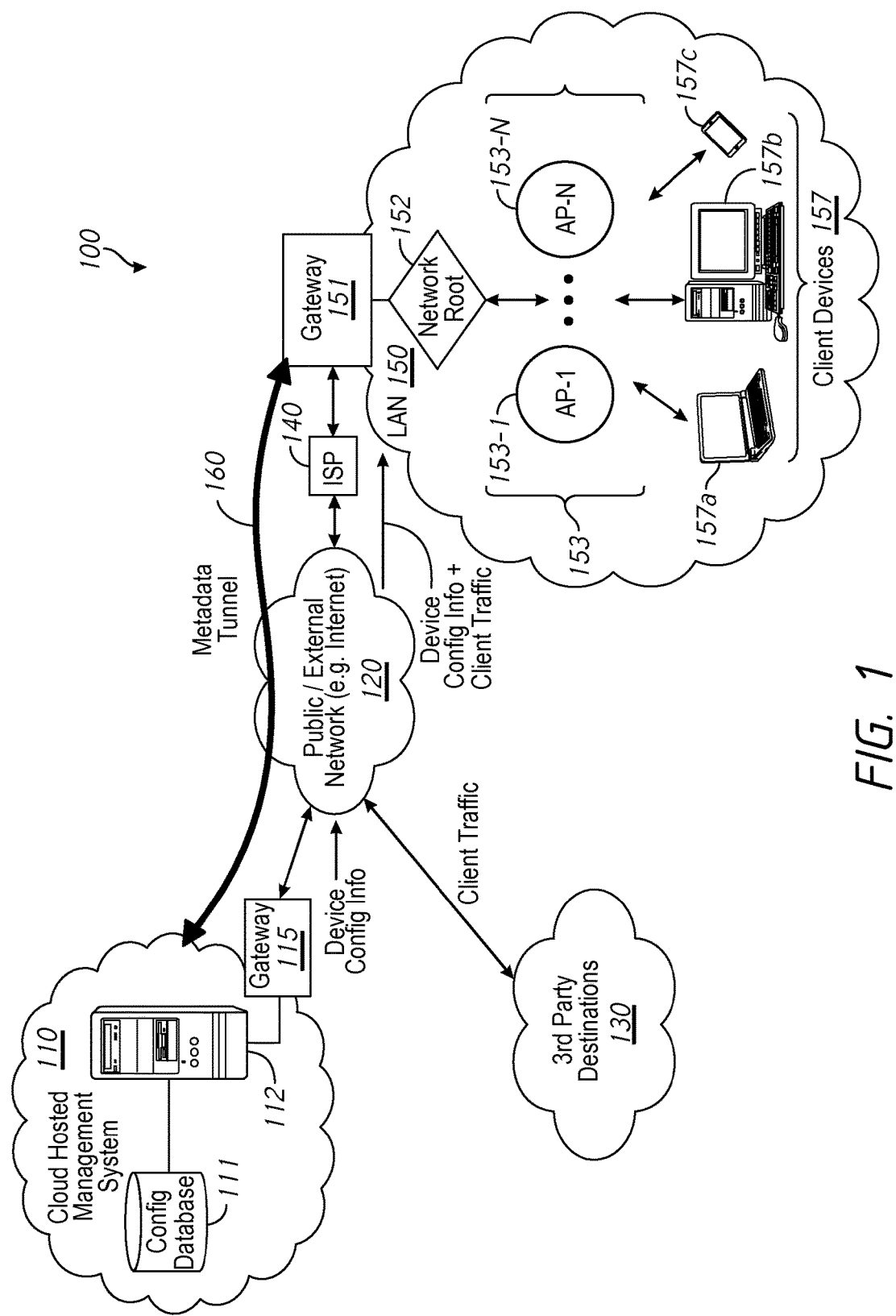
FIG. 1 is a block diagram of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for managing, collecting, and evaluating distributed traffic analysis data. For example, in some implementations, a method includes receiving, at a network endpoint device, a traffic analysis query from a network controller, the traffic analysis query including one or more query parameters, where the one or more query parameters are provided to select portions of traffic analysis data. The method also includes identifying a portion of traffic analysis data stored in a buffer that satisfies the one or more query parameters, where the traffic analysis data characterizes traffic data that has traversed the network endpoint device, and where the network endpoint device provides network access to one or more client devices. The method further includes providing the identified portion of the traffic analysis data to the network controller in response to the traffic analysis query.

In another example, in some implementations, a method includes obtaining, at a network controller, one or more query parameters, where the one or more query parameters are provided to select portions of traffic analysis data. The method also includes generating a traffic analysis query according to the one or more query parameters. The method further includes: sending the traffic analysis query to one or more endpoint devices; and receiving responses to the traffic analysis query from the one or more endpoint devices, where each of the responses includes at least a portion of the traffic analysis data stored in a buffer of a respective endpoint device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

Previously available traffic analysis systems employ large server-side databases and fail to provide up-to-date traffic analysis. By contrast, various implementations disclosed herein provide the collection of distributed traffic analysis data and on-demand traffic analysis that is both up-to-date and less taxing in terms of bandwidth. For example, in some implementations, each of a plurality of endpoint devices in a network stores traffic analysis data in a buffer. In some implementations, the buffer is a ring or circular buffer, which limits the amount of memory used at the endpoint device to store the traffic analysis data. Furthermore, the endpoint devices provide at least a portion of the stored traffic analysis data in response to a traffic analysis query from a network controller. As a result, live or near-live traffic analysis data is provided to the network controller in an on-demand fashion.

FIG. 1 is a block diagram of a data networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100 includes a public/external network 120 (e.g., a portion of the Internet), one or more third-party destinations 130 (e.g., providing various third-party content and services), a cloud hosted network management system 110, an Internet service provider (ISP) node 140, and a local area network (LAN) 150.

The one or more third-party destinations 130 provide various third-party content and services such as email, media content (e.g., video, music, gaming, etc.), online banking, social networking servers, etc. Other than providing sources and/or destinations for client data traffic, an exhaustive description of the numerous examples of third-party destinations are not particularly pertinent to the scope of the present disclosure. As such, no further details pertaining to the one or more third-party destinations 130 are provided for the sake of brevity.

In various implementations, the LAN 150 includes a gateway node 151, a network root node 152, a number of compliant access points (APs) 153 (e.g., AP-1 153-1, ..., AP-N 153-N), and a number of client devices 157. In some implementations, the APs 153 provide network access to client devices 157 in the LAN 150. The gateway device 151 connects the LAN 150 to the public network 120 through the ISP node 140 and, for example, includes features such as a firewall. In some implementations, the gateway device 151 is provided as a single entity (e.g., a server, a virtual machine, etc.). In some implementations, the gateway device 151 includes a distributed system including a suitable combination of software, data structures, virtual machines, computing devices, servers, switches, and routers. Merely for the sake of brevity and convenience of explanation, the gateway device 151 is described herein as a single entity.

In some implementations, the network root node 152 is a virtual node or logical place-holder within the LAN 150. In such instances, the network root node 152 merely provides a convenient LAN node that is separate from the gateway node 151. In some implementations, the network root node 152 is a physical device that is separate from the gateway node 151. In some implementations, the network root node 152 is included as a part of the gateway node 151.

Client devices 157 generally include any suitable computing device such as a computer, a laptop computer, a tablet device, a netbook, an internet kiosk, a personal digital assistant, a mobile phone, a smartphone, a wearable device, a gaming device, a computer server, or the like. In some implementations, each client device (e.g., laptop 157a, workstation 157b, smartphone 157c, etc.) includes one or more processors, one or more types of memory, a display, and/or other user interface components such as a keyboard, a touch screen display, a mouse, a track-pad, a digital camera, and/or any number of supplemental devices to add functionality. In some implementations, a client device includes a suitable combination of hardware, software, and firmware configured to provide at least some of protocol processing, modulation, demodulation, data buffering, power control, routing, switching, clock recovery, amplification, decoding, and error control.

In various implementations, the difference between the compliant APs 153 and non-compliant networking devices (not shown) is based at least on the extent to which a device is able to functionally cooperate with the cloud hosted network management system 110. In some implementations, compliant devices, including the compliant APs 153, are configured to communicate and operate in accordance with configuration instructions, software and/or firmware updates, and rules provided by the cloud hosted network management system 110. To that end, in accordance with some implementations, a metadata tunnel 160 is established from the gateway node 115 of the cloud hosted network management system 110 to the gateway node 151 of the LAN 150.

The cloud hosted network management system 110 (also referred to as a "network controller" hereinafter) is configured to manage the configuration and operation of compliant devices in a LAN and/or across geographically distributed portions of a virtual local area network (VLAN). To that end, the cloud hosted network management system 110 includes a configuration database 111, a cloud hosted network management server 112, and a gateway device 115. In some implementations, the configuration database 111 stores configuration parameters for initializing, updating, and maintain the gateway node 151, the network root node 152, the APs 153, and/or client devices 157. The gateway device 115 connects the cloud hosted network management server 112 to the public network 120 so that the cloud hosted network management server 112 is able to communicate with one or more LANs and/or geographically distributed portions of a VLAN and, for example, includes features such as a firewall. In some implementations, the gateway device 115 is provided as a single entity (e.g., a server, a virtual machine, etc.). In some implementations, the gateway device 115 includes a distributed system including a suitable combination of software, data structures, virtual machines, computing devices, servers, switches, and routers. Merely for the sake of brevity and convenience of explanation, the gateway device 115 is described herein as a single entity.

In some implementations, the ISP node 140 is provided to link the LAN 150 to the public network 120, and serves as a network service provider access point. Similar to the gateway nodes 115, 151, in various implementations, the ISP node 150 is provided as a single entity (e.g., a server, a virtual machine, etc.). In some implementations, the ISP node 150 is implemented as a distributed system including a suitable combination of software, data structures, virtual machines, computing devices, servers, switches, and routers. For the sake of brevity and convenience of explanation, the ISP node 150 is described herein as a single entity.

Figure 2:
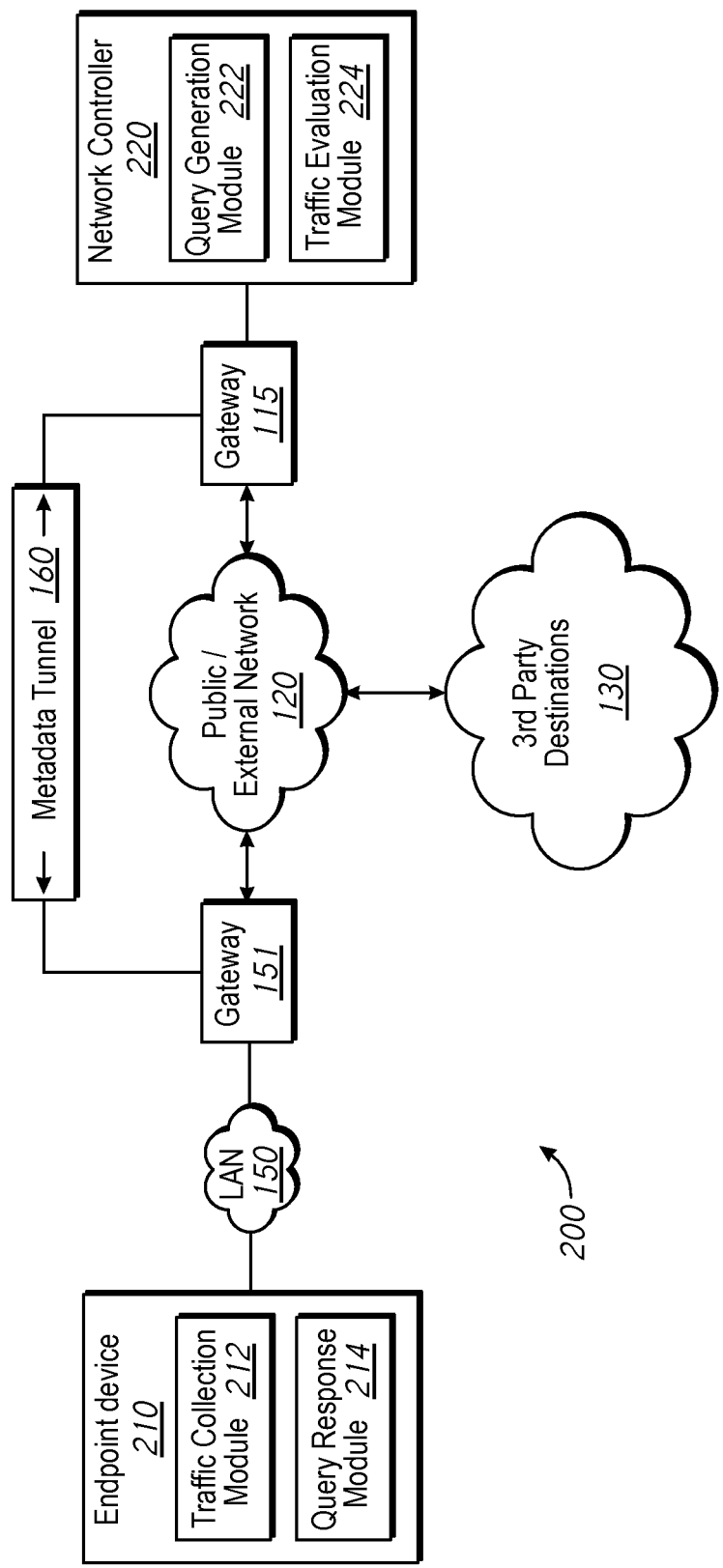
FIG. 2 is a block diagram of a data networking environment in accordance with some implementations.

FIG. 2 is a block diagram of a data networking environment 200 in accordance with some implementations. The data networking environment 200 shown in FIG. 2 is similar to and adapted from the data networking environment 100 shown in FIG. 1. Elements common to FIGS. 1 and 2 include common reference numbers, and only the differences between FIGS. 1 and 2 are described herein for the sake of brevity. To that end, FIG. 2 illustrates a simplified arrangement including an endpoint device 210 and a network controller 220 shown in the context of a networking environment. For the sake of brevity and convenience of explanation, the data networking environment 200 shown in FIG. 2 includes a single representative endpoint device 210. However, one of ordinary skill in the art will appreciate that various implementations include any number of endpoint devices.

In some implementations, the endpoint device 210 includes a traffic collection module 212, the function and operation of which is described in greater detail below with reference to FIGS. 3 and 6. In some implementations, the endpoint device 210 also includes a query response module 214, the function and operation of which is described in greater detail below with reference to FIGS. 4 and 6. In one example, the endpoint device 210 corresponds to one of the APs 153 in FIG. 1, which is included in the LAN 150 behind the LAN gateway node 151 as shown in FIG. 2. In another example, the endpoint device 210 corresponds to one of the gateway 151 or the network root node 152 (not shown in FIG. 2).

In some implementations, the network controller 220 includes a query generation module 222 and a traffic evaluation module 224, the function and operation of both of which are described in greater detail below with reference to FIGS. 5 and 7. For example, the network controller 220 corresponds to the cloud hosted network management system 110 in FIG. 1.

FIG. 2 also illustrates the metadata tunnel 160 as being a conceptually separate communication channel between the respective gateway nodes 151, 115, as compared to the public/external network 120 (e.g., a portion of the Internet). In some implementations, the metadata tunnel 160 utilizes portions of the public/external network 120. To that end, in some implementations, metadata tunnel packets are marked and/or contain header fields that enable the prioritization of metadata tunnel packets on at least some portions of the public/external network 120. In some implementations, the prioritization of metadata tunnel packets includes the use of dedicated routing paths between the endpoint device 210 and the network controller 220 in order to reduce latency and/or improve reliability.

Figure 3:
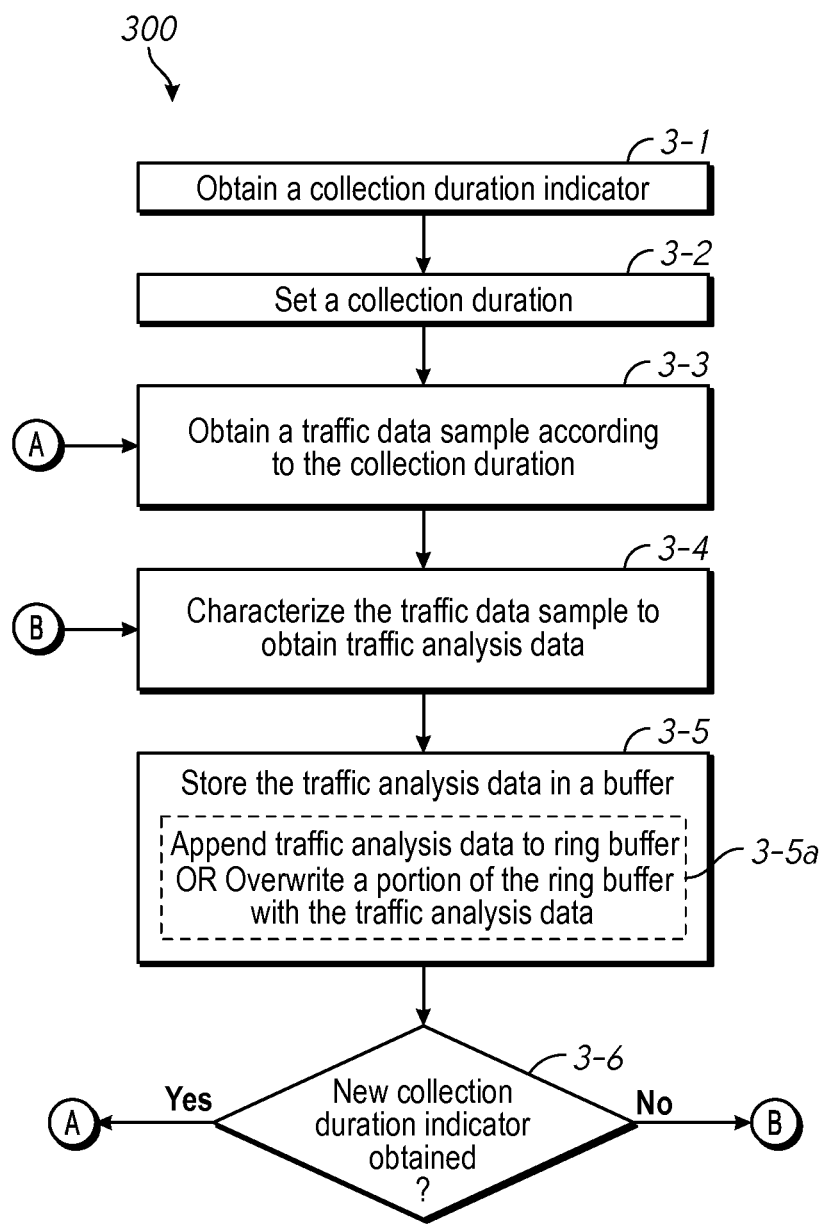
FIG. 3 is a flowchart representation of a method of obtaining traffic analysis data in accordance with some implementations.

FIG. 3 is a flowchart representation of a method 300 of obtaining traffic analysis data in accordance with some implementations. In various implementations, the method 300 is performed by a traffic collection module (e.g., the traffic collection module 212 in FIG. 2) included and/or associated with an endpoint device (e.g., the endpoint device 210 in FIG. 2). Briefly, the method 300 includes obtaining a collection duration indicator, setting a collection duration, obtaining traffic data samples according to the collection duration, characterizing the traffic data samples to obtain traffic analysis data, and storing the traffic analysis data in a buffer.

To that end, as represented by block 3-1, the method 300 includes obtaining a collection duration indicator. For example, with reference to FIG. 2, the endpoint device 210 receives the collection duration indicator from the network controller 220. In some implementations, with reference to FIG. 2, the endpoint device 210 receives the collection duration indicator from the network controller 220 over the metadata tunnel 160. In another example, with reference to FIG. 2, the endpoint device 210 retrieves the collection duration indicator from a non-transitory memory (not shown) that is local to or remote from the endpoint device 210. In some implementations, the collection duration indicator specifies a time granularity between obtaining traffic data samples (e.g., 1 ms, 100 ms, 1 s, etc.).

As represented by block 3-2, the method 300 includes setting a collection duration. For example, with reference to FIG. 2, the endpoint device 210 sets the collection duration, which specifies the time between obtaining traffic data samples, according to the obtained collection duration indicator. In some implementations, the collection duration indicator is a value indicating a time period between obtaining traffic data samples. In some implementations, the collection indicator specifies a modifier (e.g., an increase or decrease) to a default time interval between obtaining traffic data samples. In some implementations, the time interval between obtaining traffic data samples is set based on the application associated with the endpoint device. As one example, the time interval is 1 second for content delivery applications.

As represented by block 3-3, the method 300 includes obtaining a traffic data sample according to the collection duration. In some implementations, the endpoint device (e.g., the endpoint device 210 in FIG. 2) provides network access to one or more client devices (e.g., the laptop 157a, the workstation 157b, and/or the smartphone 157c in FIG. 1). As such, in some implementations, a characterization of network data traffic traversing the endpoint device (e.g., a gateway or an access point) is collected according to the collection duration in real time or near real time. In other words, the traffic data sample is a characterization of the traffic traversing the endpoint device at a particular time and/or over the collection duration. In some implementations, the traffic data sample is indexed according to sources and/or destinations and provides an indication of the number of bytes, packets, or the like received by and/or send by the sources and/or destinations. Thus, for example, a traffic data sample may indicate the number of bytes received and sent by each client device provided network access by an endpoint device over a 500 ms time period (i.e., the collection duration).

As represented by block 3-4, the method 300 includes characterizing the traffic data sample to obtain traffic analysis data. In some implementations, the traffic analysis data characterizes traffic data that has traversed the endpoint device. For example, the traffic analysis data indicates the total amount of traffic that passed through the endpoint device during the collection period. In another example, the traffic analysis data provides an indication of traffic that passed through the endpoint device during the collection period relative to an average amount of traffic or some other benchmark.

As represented by block 3-5, the method 300 includes storing the traffic analysis data in a buffer. In some implementations, the buffer is a ring buffer. For example, the ring buffer is a fixed size buffer that is logically and operated such that, instead of overflowing when the end of the buffer is reached, a portion of the buffer is overwritten. In some implementations, the ring buffer includes a first pointer indicating the start of valid data and a second pointer indicating the end of valid data. To that end, as represented by block 3-5*a*, in some implementations, the traffic analysis data is added to the ring buffer after the second pointer if there is room between the second pointer and the end of the ring buffer (i.e., the ring buffer is not yet full). On the other hand, as represented by block 3-5*a*, in some implementations, the traffic analysis data overwrites a portion of the ring buffer if one or more predefined buffer overflow criteria are satisfied. For example, the one or more predefined buffer overflow criteria are satisfied when there is no room between the second pointer and the end of the ring buffer (i.e., the ring buffer is full).

As represented by block 3-6, the method 300 includes determining whether or not a new collection duration indicator is obtained within a specified time period. In some implementations, the specified time period is the collection duration. As such, if a new collection duration indicator is obtained before the collection duration elapses a new collection duration is set and the next traffic data sample is obtained according to the new collection duration. If a new collection duration indicator is obtained within the specified time period ("Yes" path from block 3-6), the method 300 repeats block 3-2. For example, with reference to FIG. 2, the endpoint device 210 sets a subsequent collection duration according to the new collection duration indicator, which was obtained within the specified time out period. If a new collection duration indicator is not obtained within the specified time period ("No" path from block 3-6), the method 300 repeats block 3-3. For example, with reference to FIG. 2, the endpoint device 210 obtains a subsequent traffic data sample according to the previously set collection duration.

Figure 4:
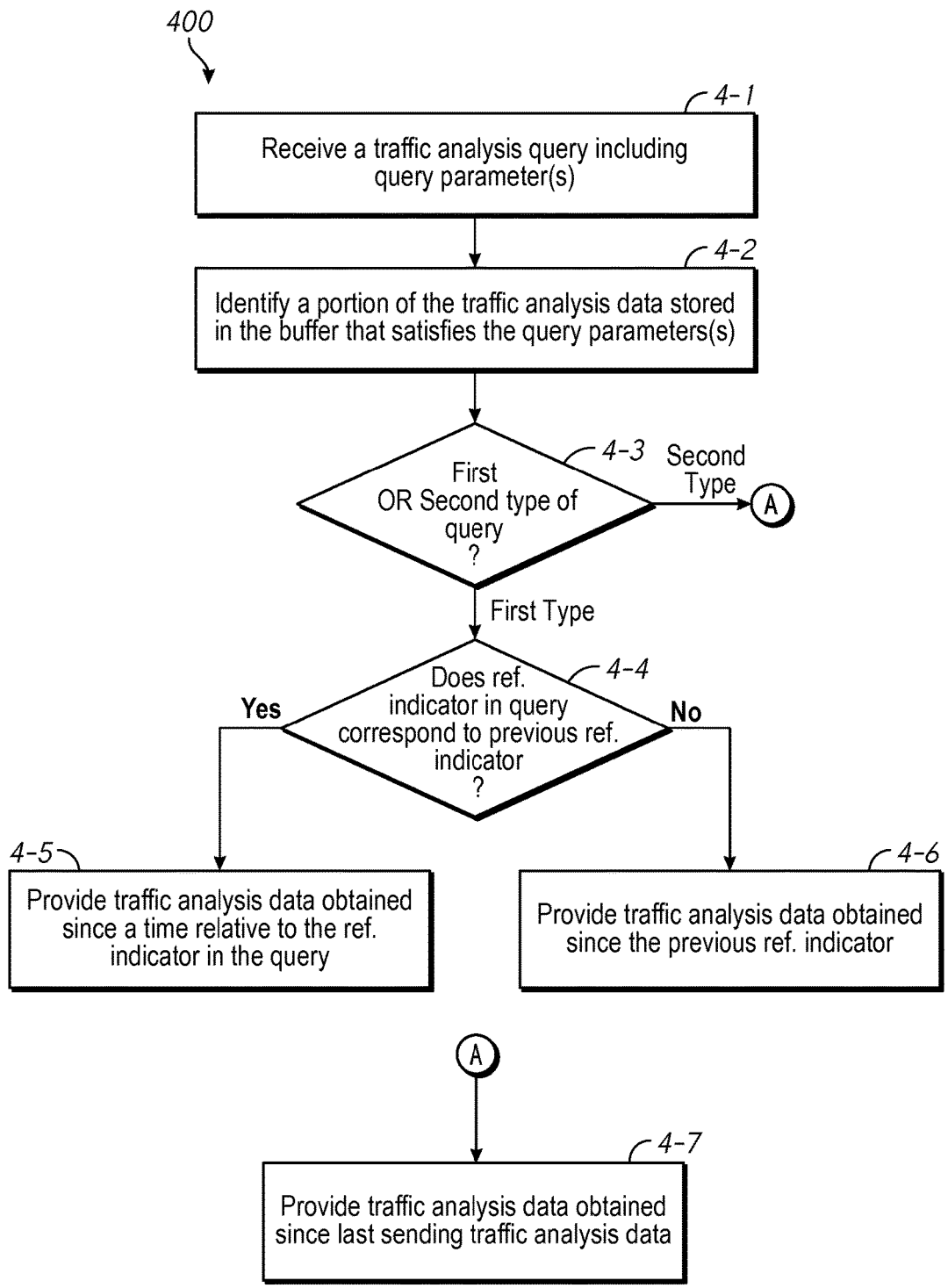
FIG. 4 is a flowchart representation of a method of handling a traffic analysis query in accordance with some implementations.

FIG. 4 is a flowchart representation of a method 400 of handling a traffic analysis query in accordance with some implementations. In various implementations, the method 400 is performed by a query response module (e.g., the query response module 214 in FIG. 2) included and/or associated with an endpoint device (e.g., endpoint device 210 in FIG. 2). Briefly, the method 400 includes receiving a traffic analysis query including one or more query parameters, identifying a portion of the traffic analysis data stored in the buffer according to the one or more query parameters, determining whether the traffic analysis query corresponds to a first query type or a second query type, and providing traffic analysis data based on the query type.

To that end, as represented by block 4-1, the method 400 includes receiving a traffic analysis query including one or more query parameters. For example, with reference to FIG. 2, the endpoint device 210 receives a traffic analysis query from the network controller 220 over the metadata tunnel 160.

As represented by block 4-2, the method 400 includes identifying a portion of the traffic analysis data stored in the buffer that satisfies the one or more query parameters. For example, with reference to FIG. 2, the endpoint device 210 identifies traffic analysis data stored in the buffer that matches or corresponds to the one or more query parameters. In some implementations, the one or more query parameters are provided to select portions of traffic analysis data. In other words, the one or more query parameters provide criteria for filtering the traffic analysis data. For example, a respective query parameter specifies a particular source or destination (e.g., all traffic associated with a particular port, IP address, URL, client device, SSID, or AP). In another example, a respective query parameter specifies a particular traffic type (e.g., media content delivery traffic) or class of service. In another example, a respective query parameter specifies a particular traffic protocol (e.g., IPv6). In yet another example, a respective query parameter specifies a rule set (e.g., traffic associated with video. traffic associated with data backups, or more generally traffic associated with one or more particular OSI layers such as layers 6-7). In yet another example, a respective query parameter specifies an algorithm for filtering the traffic analysis data.

In some implementations, the one or more query parameters also define a time window for the traffic analysis data that is to be sent by the endpoint device (e.g., a token or a "time since" request). For example, a respective query parameter indicates that all traffic analysis data since a last response should be sent. In another example, a respective query parameter indicates that all traffic analysis data since a specified response should be sent. In another example, a respective query parameter indicates that all traffic analysis data since a particular time and day should be sent. In yet another example, a respective query parameter indicates that all traffic analysis data in a particular time window should be sent (e.g., last Wednesday from 5:00 AM-6:00 AM). In yet another example, a respective query parameter indicates that all traffic analysis data in two or more particular time windows should be sent (e.g., every Wednesday from 5:00 AM-6:00 AM for the last three months). In FIG. 4, block 4-2 occurs before block 4-3 for the sake of brevity and convenience of explanation; however, one of ordinary skill in the art will appreciate that, in some circumstances, block 4-2 may be performed after block 4-3 or concurrently with block 4-3.

As represented by block 4-3, the method 400 includes determining whether the traffic analysis query corresponds to a first query type or a second query type. For example, the traffic analysis query corresponds to the first query type when the query includes a token with a time indicator (e.g., a particular time or a time window), and a reference indicator such as a boot number associated with a count of resets of the system (e.g., the network controller 220 in FIG. 2). For example, the traffic analysis query corresponds to the second query type when the query includes does not include a token and instead includes a "time since" indicator. Sometimes the second query type is also referred to as a "time since" request for traffic analysis data obtained since a last response by the endpoint device. In some implementations, with reference to FIG. 2, the endpoint device 210 determines whether the traffic analysis query corresponds to a first query type or a second query type based on the one or more query parameters. For example, one of the one or more query parameters corresponds to the token or the "time since" indicator.

If the traffic analysis request corresponds to the first query type ("First Type" path from block 4-3), as represented by block 4-4, the method 400 includes determining whether the reference indicator included in the traffic analysis query corresponds to a previous reference indicator. As such, for example, with reference to FIG. 2, the endpoint device 210 determines whether or not the reference indicator included in the traffic analysis query matches a previous reference indicator. In other words, the endpoint device 210 determines whether the token is comprehensible. For example, the previous reference indicator is a default boot number or the boot number associated with the previous traffic analysis query of the first type. In another example, the previous reference indicator is a boot number that was previously obtained by the endpoint device 210.

If the reference indicator included in the traffic analysis query corresponds to the previous reference indicator ("Yes" path from block 4-4), as represented by block 4-5, the method 400 include providing traffic analysis data that has been obtained since a time relative to the reference indicator in the traffic analysis query. For example, with reference to FIG. 2, the endpoint device 210 provides traffic analysis data to the network controller 220 that satisfies the one or more query parameters (as described with reference to block 4-2) and that has been obtained since the time indicator in the token relative to the reference indicator in the token. For example, the reference indicator (e.g., a boot number) corresponds to a date (e.g., 1 Jan. 2015) and the time indicator specifies a time period (e.g., Tuesday 2:00 AM-4:00 AM). Continuing with this example, the endpoint device 210 provides all traffic analysis data to the network controller 220 that matches the query parameters and that has been obtained on Tuesdays between 2:00 AM-4:00 AM from 1 Jan. 2014 to the present. For example, with reference to FIG. 2, the endpoint device 210 provides the traffic analysis data to the network controller 220 over the metadata tunnel 160.

If the reference indicator included in the traffic analysis query does not correspond to the previous reference indicator ("No" path from block 4-4), as represented by block 4-6, the method 400 includes providing traffic analysis data that has been obtained since the previous reference indicator. For example, with reference to FIG. 2, the endpoint device 210 provides traffic analysis data to the network controller 220 that satisfies the one or more query parameters (as described with reference to block 4-2) and that has been obtained since the previous reference indicator. For example, with reference to FIG. 2, the endpoint device 210 provides the traffic analysis data to the network controller 220 over the metadata tunnel 160.

If the traffic analysis request corresponds to the second query type ("Second Type" path from block 4-3), as represented by block 4-7, the method 400 includes providing traffic analysis data that has been obtained since last sending traffic analysis data. For example, with reference to FIG. 2, the endpoint device 210 provides traffic analysis data to the network controller 220 that satisfies the one or more query parameters (as described with reference to block 4-2) and that has been obtained since last sending traffic analysis data to the network controller 220. In other words, the endpoint device 210 provides all traffic analysis data obtained since a last query. For example, with reference to FIG. 2, the endpoint device 210 provides the traffic analysis data to the network controller 220 over the metadata tunnel 160.

Figure 5:
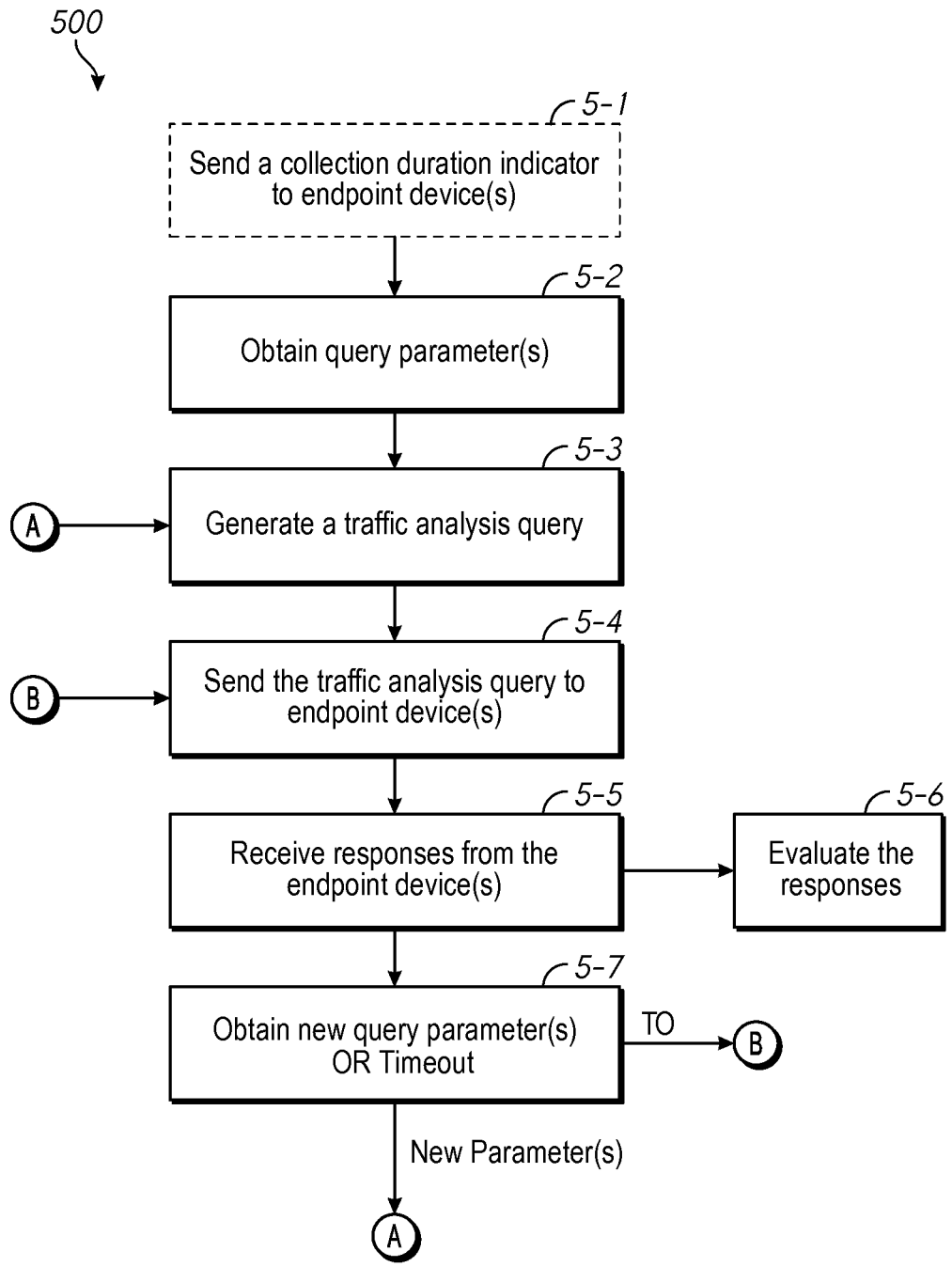
FIG. 5 is a flowchart representation of a method of managing traffic analysis queries in accordance with some implementations.

FIG. 5 is a flowchart representation of a method 500 of managing traffic analysis queries according to some implementations. In various implementations, the method 500 is a network controller (e.g., the cloud hosted network management system 110 in FIG. 1 or the network controller 220 in FIG. 2) or one or more components thereof. Briefly, the method 500 includes generating a traffic analysis query according to one or more obtained query parameters, sending the traffic analysis query to one or more endpoints, and receiving responses to the traffic analysis query from the one or more endpoint devices.

In some implementations, as represented by block 5-1, the method 500 includes sending a collection duration indicator to one or more endpoint devices. For example, with reference to FIG. 2, the network controller 220 sends the collection duration indicator to the one or more endpoint devices over one or more metadata tunnels. In some implementations, the collection duration indicator specifies a time granularity between which the endpoint device 220 obtains traffic data samples (e.g., 1 ms, 100 ms, 1 s, etc.). In some implementations, the collection indicator specifies a modifier (e.g., an increase or decrease) to a default time interval between obtaining traffic data samples. In some implementations, the time collection duration indicator s is set based on the application associated with the one or more endpoint devices.

As represented by block 5-2, the method 500 includes obtaining one or more query parameters. In some implementations, the query parameters are input by a user wishing to perform analysis on some portion of traffic within the network (e.g., data networking environment 100 in FIG. 1). In some implementations, the query parameters are received from a routine that performs periodic analysis on some portion of traffic within the network (e.g., data networking environment 100 in FIG. 1).

As represented by block 5-3, the method 500 includes generating a traffic analysis query according to the one or more query parameters. For example, with reference to FIG. 2, the network controller 220 or a component thereof (e.g., the query generation module 222) generates a traffic analysis query according to the one or more query parameters obtained in block 5-2. The query parameters are discussed in more detail above with respect to block 4-2.

As represented by block 5-4, the method 500 includes sending the traffic analysis query to one or more endpoint devices. For example, with reference to FIG. 2, the network controller 220 or a component thereof (e.g., the query generation module 222) sends the traffic analysis query to one or more endpoint devices in the data networking environment 200. In some implementations, with reference to FIG. 2, the network controller 220 sends the traffic analysis query to the one or more endpoint devices over one or more metadata tunnels. In some implementations, the one or more endpoint devices are selected based on the one or more query parameters. In some implementations, the one or more endpoint devices are selected based on a set of rules such as previously calculated peak time(s) and/or geographic location(s). In some implementations, the one or more endpoint devices are selected based on periodic selection scheme (e.g., send queries to endpoint devices every X minutes on a rotating basis). In some implementations, the one or more endpoint devices are selected based on the originator of the one or more query parameters (e.g., the user that input the one or more query parameters).

As represented by block 5-5, the method 500 includes receiving responses to the traffic analysis query from the one or more endpoint devices. For example, with reference to FIG. 2, the network controller 220 or a component thereof (e.g., the query generation module 222) receives responses to the traffic analysis query from the one or more endpoint devices. In some implementations, with reference to FIG. 2, the network controller 220 receives the responses from the one or more endpoint devices over one or more metadata tunnels. In some implementations, with reference to FIG. 2, if a response is not received from a respective endpoint device within a predefined response duration, the network controller 220 or a component thereof (e.g., the query generation module 222) re-sends the traffic analysis query to the respective endpoint device. In some implementations, with reference to FIG. 2, if a response is not received from a respective endpoint device within a predefined response duration, the network controller 220 or a component thereof (e.g., the query generation module 222) sends an error message to the operator of the respective endpoint device.

As represented by block 5-6, the method 500 includes evaluating the responses from the one or more endpoint devices. In some implementations, with reference to FIG. 2, the network controller 220 or a component thereof (e.g., the traffic evaluation module 224) processes and evaluates the responses from the one or more endpoint devices based on one or more analysis criteria. For example, the one or more analysis criteria are set by the originator of the one or more query parameters. For example, the one or more analysis criteria are a default set of statistical algorithms that may be changed and/or modified. In some implementations, with reference to FIG. 2, the network controller 220 or a component thereof (e.g., the traffic evaluation module 224) aggregates the responses according to one or more predefined aggregation criteria. For example, the predefined aggregation criteria include a predefined algorithm, a set of rules, or the like. In some implementations, with reference to FIG. 2, the network controller 220 or a component thereof (e.g., the traffic evaluation module 224) provides at least a portion of the responses from the one or more endpoint devices in a displayable format. For example, the network controller 220 sends the portion of the responses to the originator of the one or more query parameters in a displayable format. In another example, the network controller 220 display the portion of the responses within a dashboard that is accessible to the originator of the one or more query parameters.

As represented by block 5-7, the method 500 includes determining whether or not one or more new query parameters have been obtained within a specified time out period. If one or more new query parameters are obtained within the specified time out period ("New Parameter(s)" path from block 5-7), the method 500 repeats block 5-3. For example, with reference to FIG. 2, the network controller 220 generates a subsequent traffic analysis query according to the one or more new query parameters. If one or more new query parameters are not obtained within the specified time out period ("TO" path from block 5-7), the method 500 repeats block 5-4. For example, with reference to FIG. 2, the network controller 220 re-sends the previously generated traffic analysis query to the one or more endpoint devices according to a schedule or query period set by the originator of the query parameters. Alternatively, if one or more new query parameters are not obtained within the specific time out period, the method 500 waits until one or more new query parameters are obtained before repeating block 5-3.

Figure 6:
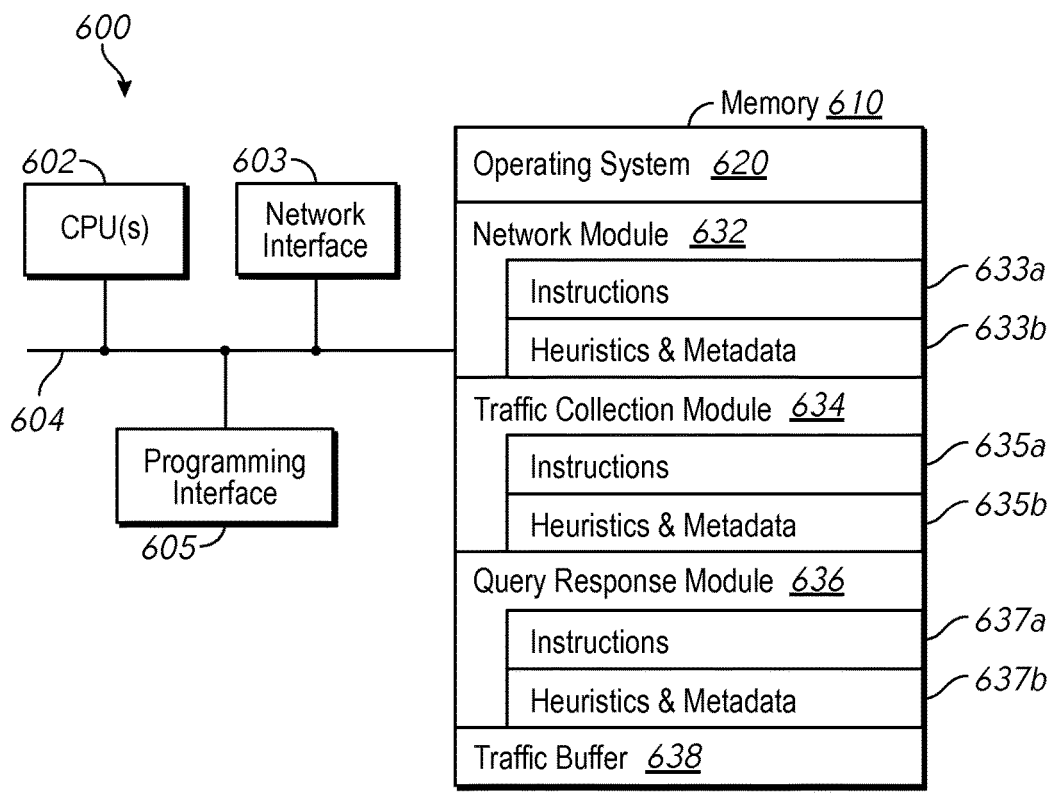
FIG. 6 is a block diagram of an example of an endpoint device in accordance with some implementations.

FIG. 6 is a block diagram of an example of an endpoint device 600 configured in accordance with some implementations. For example, in some implementations, the endpoint device 600 is similar to and adapted from the endpoint device 210 in FIG. 2, which is a representative endpoint device of a plurality of endpoint devices in the data networking environment 200. For example, the endpoint device 610 is one of the gateway node 151 and the network root node 152 in FIG. 1. In another example, the endpoint device 610 is one of the APs 153 in FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the endpoint device 600 includes one or more processing units (CPU's) 602, a network interface 603, a memory 610, a programming (I/O) interface 605, and one or more communication buses 604 for interconnecting these and various other components.

In some implementations, the one or more communication buses 604 include circuitry that interconnects and controls communications between system components. The memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 610 optionally includes one or more storage devices remotely located from the CPU(s) 602. The memory 610 comprises a non-transitory computer readable storage medium. In some implementations, the memory 610 or the non-transitory computer readable storage medium of the memory 610 stores the following programs, modules and data structures, or a subset thereof including an optional operating system 620, a network module 632, a traffic collection module 634, a query response module 636, and a traffic buffer 638.

The operating system 620 includes procedures for handling various basic system services and for performing hardware dependent tasks.

In some implementations, the network module 632 is configured to provide network access to one or more client devices (e.g., the laptop 157*a*, the workstation 157*b*, and/or the smartphone 157*c* in FIG. 1). To that end, in various implementations, the network module 632 includes instructions and/or logic 633*a*, and heuristics and metadata 633*b*.

In some implementations, the traffic collection module 634 is configured to obtain traffic data samples according to a collection duration, characterize the traffic data samples to obtain traffic analysis data, and store the traffic analysis data in the traffic buffer 638. To that end, in various implementations, the traffic collection module 634 includes instructions and/or logic 635*a*, and heuristics and metadata 635*b*. In some implementations, the traffic collection module 634 is similar to and adapted from the traffic collection module 212 (FIG. 2) which is discussed in further detail with reference to FIG. 3.

In some implementations, the traffic buffer 638 is configured to store traffic analysis data. In some implementations, the traffic buffer 638 is a ring buffer with a fixed size that is logically connected end-to-end. As such, in some implementations, new traffic analysis data overwrites old traffic analysis data if predefined buffer overflow criteria are satisfied.

Figure 7:
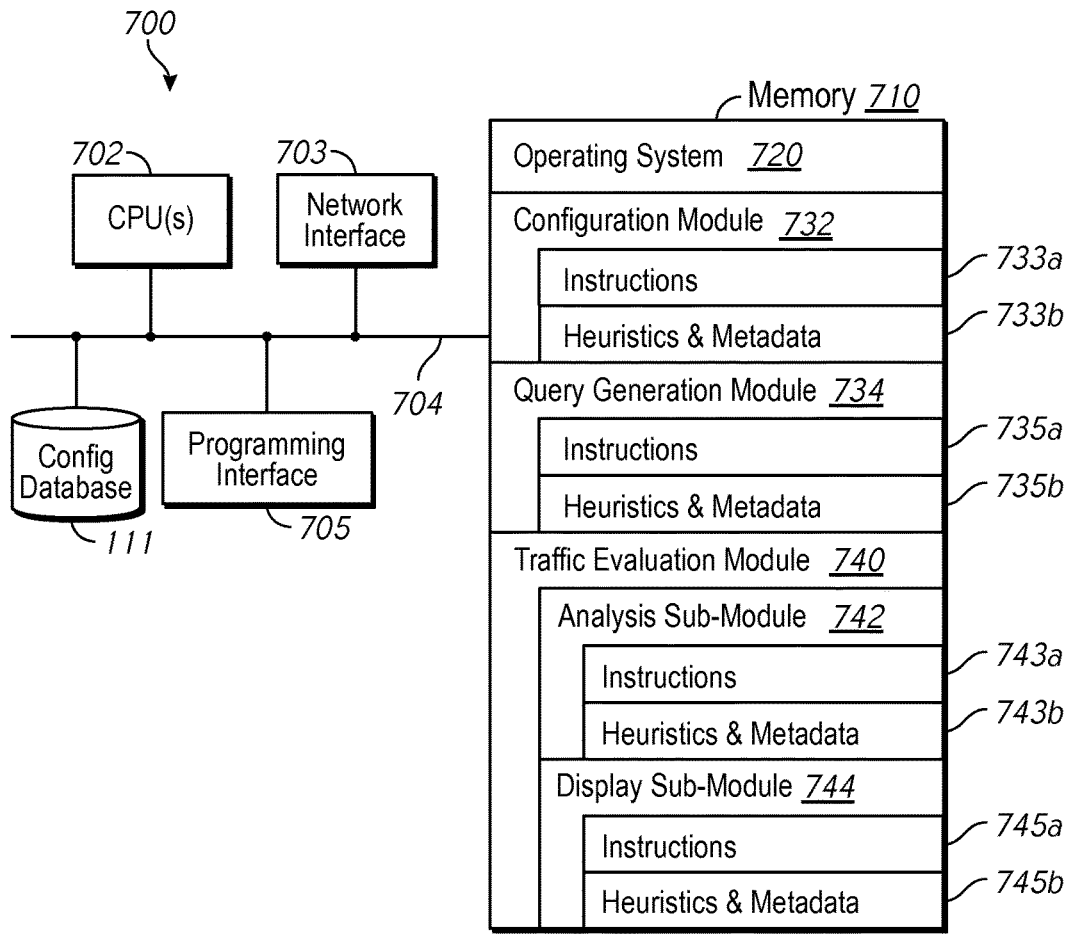
FIG. 7 is a block diagram of an example of a network controller in accordance with some implementations.

In some implementations, the query response module 636 is configured to respond to traffic analysis queries by providing at least a portion of the traffic analysis data stored in the traffic buffer 638 to a network controller (e.g., the network controller 700 in FIG. 7). To that end, in various implementations, the query response module 636 includes instructions and/or logic 637*a*, and heuristics and metadata 637*b*. In some implementations, the query response module 636 is similar to and adapted from the query response module 214 (FIG. 2) which is discussed in further detail with reference to FIG. 4.

Although the network module 632, the traffic collection module 634, and the query response module 636 are illustrated as residing on a single device (i.e., the endpoint device 600), it should be understood that in other implementations, any combination of the network module 632, the traffic collection module 634, and the query response module 636 may reside in separate computing devices. For example, each of the network module 632, the traffic collection module 634, and the query response module 636 may reside on a separate device.

Moreover, FIG. 6 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software, and/or firmware chosen for a particular embodiment.

FIG. 7 is a block diagram of an example of a network controller 700 in accordance with some implementations. For example, in some implementations, the network controller 700 is similar to and adapted from the network controller 220 in FIG. 2. For example, the network controller 700 is the cloud hosted network management system 110 in FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network controller 700 includes one or more processing units (CPU's) 702, a network interface 703, a memory 710, a programming (I/O) interface 705, a configuration database 111, and one or more communication buses 704 for interconnecting these and various other components.

In some implementations, the one or more communication buses 704 include circuitry that interconnects and controls communications between system components. The configuration database 111 stores configuration parameters for initializing, updating, and maintaining endpoints devices (e.g., including the endpoint device 600 in FIG. 6). The memory 710 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. In some implementations, the memory 710 or the non-transitory computer readable storage medium of the memory 710 stores the following programs, modules and data structures, or a subset thereof including an optional operating system 720, a configuration module 732, a query generation module 734, and a traffic evaluation module 740.

The operating system 720 includes procedures for handling various basic system services and for performing hardware dependent tasks.

In some implementations, the configuration module 732 is configured to initialize, update, and maintain endpoint devices with various configuration parameters stored in the configuration database 111. For example, the configuration module 732 is configured to send a collection duration indicator to the endpoint devices, which specifies a time granularity between which the endpoint devices obtain traffic data samples. To that end, in various implementations, the configuration module 732 includes instructions and/or logic 733a, and heuristics and metadata 733b.

In some implementations, the query generation module 734 is configured generate a traffic analysis query according to one or more query parameters and send the traffic analysis query to one or more endpoint devices. To that end, in various implementations, the query generation module 734 includes instructions and/or logic 735a, and heuristics and metadata 735b.

In some implementations, the traffic evaluation module 740 is configured to receive responses to the traffic analysis query sent from the one or more endpoint devices and evaluate the responses. To that end, in various implementations, the traffic evaluation module 740 includes an analysis sub-module 742 and a display sub-module 744. In various implementations, these and other modules included in the network controller 700 include a suitable combination of software, hardware and/or firmware including digital logic, machine-executable computer code instructions, and programmable logic.

In some implementations, the analysis sub-module 742 is configured aggregate the responses according to one or more aggregation criteria and perform statistical analysis on the aggregated responses. To that end, in various implementations, the analysis sub-module 742 includes instructions and/or logic 743a, and heuristics and metadata 743b.

In some implementations, the display sub-module 744 is configured provide at least a portion of the responses from the one or more endpoint devices in a displayable format. To that end, in various implementations, the display sub-module 744 includes instructions and/or logic 745a, and heuristics and metadata 745b.

Although the configuration module 732, the query generation module 734, and the traffic evaluation module 740 are illustrated as residing on a single device (i.e., the network controller 700), it should be understood that in other implementations, any combination of the configuration module 732, the query generation module 734, and the traffic evaluation module 740 may reside in separate computing devices. For example, each of the configuration module 732, the query generation module 734, and the traffic evaluation module 740 may reside on a separate device.

Moreover, FIG. 7 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
receiving, at an endpoint device in a network, a traffic analysis query from a network controller, the traffic analysis query including one or more query parameters, wherein the one or more query parameters are provided to select portions of traffic analysis data;
identifying a portion of traffic analysis data stored in a buffer that satisfies the one or more query parameters, wherein the traffic analysis data characterizes traffic data that has traversed the endpoint device, and wherein the endpoint device is configured to provide network access to one or more client devices for accessing the network; and
providing the identified portion of the traffic analysis data to the network controller in response to the traffic analysis query, wherein:
when the traffic analysis query is a first query type, providing the identified portion of the traffic analysis data that has been obtained since a time relative a reference indicator; and
when the traffic analysis query is a second query type, providing the identified portion of the traffic analysis data that has been obtained since last sending traffic analysis data.

2. The method of claim 1, wherein the endpoint device comprises a wireless access point (AP) or a gateway of the network, the method further comprising:
obtaining, at the endpoint device, traffic analysis data characterizing traffic data to and from the one or more client devices that traverses the endpoint device; and
storing the traffic analysis data in the buffer.

3. The method of claim 1, wherein the buffer is a ring buffer, and the method further comprises overwriting previously obtained traffic analysis data stored in the ring buffer according to predefined buffer overflow criteria.

4. The method of claim 1, wherein each of the one or more query parameters are one of a source, a destination, a traffic type, a class of service, a traffic protocol, a rule set, or an algorithm.

5. The method of claim 1, further comprising:
receiving a collection duration indicator from a network controller, wherein the collection duration indicator specifies a time granularity between obtaining traffic data samples.

6. The method of claim 1, further comprising:
retrieving a collection duration indicator from non-transitory memory, wherein the collection duration indicator specifies a time granularity between obtaining traffic data samples.

7. The method of claim 1, further comprising:
determining whether the traffic analysis query corresponds to the first query type or the second query type.

8. The method of claim 1, further comprising:
when the traffic analysis query is the first query type, determining whether the reference indicator included in the traffic analysis query corresponds to a previously received reference indicator.

9. The method of claim 8, wherein providing the identified portion of the traffic analysis data comprises providing traffic analysis data that has been obtained since a time relative to the reference indicator as specified by a relative time indicator in response to determining that the reference indicator corresponds to the previously received reference indicator.

10. The method of claim 8, wherein providing the identified portion of the traffic analysis data comprises providing traffic analysis data that has been obtained since the previously received reference indicator in response to determining that the respective reference indicator does not correspond to the previously received reference indicator.

11. The method of claim 9, wherein the relative time indicator specifies a time period.

12. An endpoint device comprising:
a network interface configured to interface with a network;
one or more processors coupled to the network interface;
memory for storing a plurality of modules including a network module, a traffic collection module, and a query response module;
the one or more processors configured to execute instructions of the network module to provide network access to one or more client devices for accessing the network;
the one or more processors configured to execute instructions of the traffic collection module to:
produce traffic analysis data characterizing traffic data to and from the one or more client devices that traverses the endpoint device;
store the traffic analysis data in a buffer;
the one or more processors configured to execute instructions of the query response module to:

receive, at the endpoint device, a traffic analysis query from a network controller, the traffic analysis query including one or more query parameters, wherein the one or more query parameters provided to select portions of the traffic analysis data;

identify a portion of traffic analysis data stored in the buffer that satisfies the one or more query parameters, wherein the traffic analysis data characterizes traffic data that has traversed the endpoint device; and provide the identified portion of the traffic analysis data to the network controller in response to the traffic analysis query, wherein:

when the traffic analysis query is a first query type, providing the identified portion of the traffic analysis data that has been obtained since a time relative a reference indicator; and when the traffic analysis query is a second query type, providing the identified portion of the traffic analysis data that has been obtained since last sending traffic analysis data.

13. The endpoint device of claim 12, wherein the one or more processors are configured to execute the instructions of the traffic collection module to:

when the traffic analysis query is the first query type, determining whether the reference indicator included in the traffic analysis query corresponds to a previously received reference indicator; and wherein providing the identified portion of the traffic analysis data comprises providing traffic analysis data that has been obtained since a time relative to the reference indicator as specified by a relative time indicator in response to determining that the reference indicator corresponds to the previously received reference indicator.

14. The endpoint device of claim 12, wherein the buffer comprises a ring buffer, and the one or more processors are configured to execute the instructions of the traffic collection module to overwrite previously obtained traffic analysis data stored in the ring buffer according to predefined buffer overflow criteria.

15. A method comprising:

obtaining, at a network controller, one or more query parameters, wherein the one or more query parameters provided to select portions of traffic analysis data;

generating a traffic analysis query according to the one or more query parameters;

sending the traffic analysis query to one or more endpoint devices, each endpoint device of a network being configured to provide network access to one or more client devices for accessing the network; and receiving responses to the traffic analysis query from the one or more endpoint devices, wherein each of the responses includes at least a portion of the traffic analysis data stored in a buffer of a respective endpoint device, wherein:

when the traffic analysis query is a first query type, receiving responses which include at least a portion of traffic analysis data that has been obtained since a time relative a reference indicator, and when the traffic analysis query is a second query type, receiving responses which include at least a portion of traffic analysis data that has been obtained since last sending traffic analysis data.

16. The method of claim 15, further comprising:

sending a collection duration indicator to the one or more endpoint devices indicative of a predefined time interval, wherein the collection duration indicator specifies a duration between obtaining traffic analysis data samples.

17. The method of claim 15, further comprising:

providing at least a portion of the responses from the one or more endpoint devices in a displayable format.

18. The method of claim 15, further comprising:

aggregating the responses from the one or more endpoint devices according to one or more predefined aggregation criteria.

19. The endpoint device of claim 12, which comprises a wireless access point (AP) to provide wireless network access to the one or more client devices for connecting to the network.

20. The endpoint device of claim 12, which comprises a gateway of the network.

* * * * *